March 7, 1939.  S. O. TRUMAN  2,150,086
OIL GAUGE LINE WIPER AND BRAKE
Filed Oct. 18, 1937
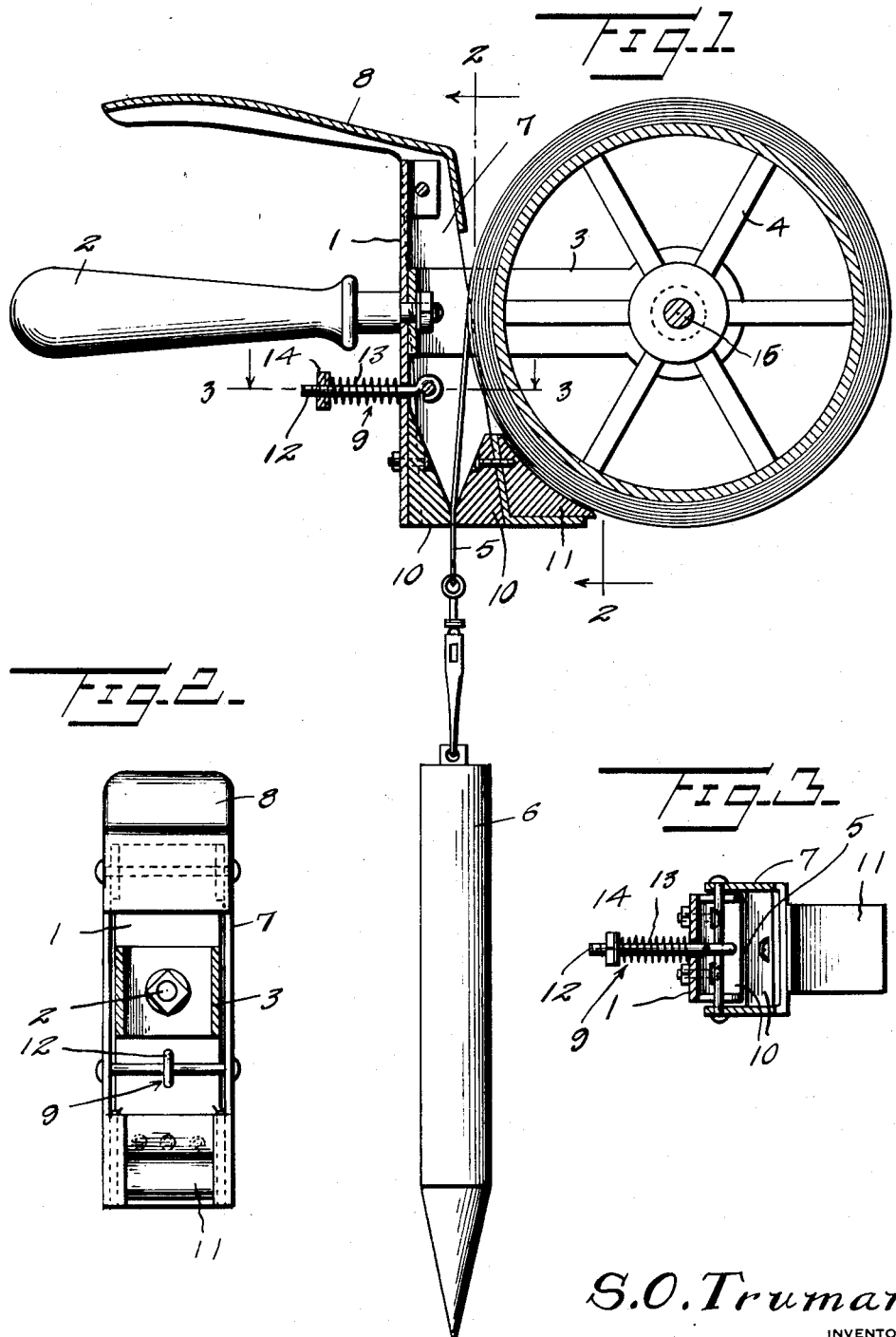
S. O. Truman
INVENTOR
BY Victor J. Evans & Co.
ATTORNEY Patented Mar. 7, 1939

2,150,086

UNITED STATES PATENT OFFICE 2,150,086

OIL GAUGE LINE WIPER AND BRAKE

Sam O. Truman, Overton, Tex.

Application October 18, 1937, Serial No. 169,726

3 Claims. (Cl. 242—84.8)

This invention relates to an oil gauge line wiper and brake and has for the primary object the provision of a portable gauge line reel equipped with means for wiping the line as the latter is wound on the reel for conditioning the line for another measuring operation and a brake mechanism having an actuating means whereby the speed at which the line feeds from the reel may be varied and also acting to disengage the wiping means from the line.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating an oil gauge line wiper and brake constructed in accordance with my invention.

Figure 2 is a sectional view taken on the line 2—2 of Figure 1.

Figure 3 is a sectional view taken on the line 3—3 of Figure 1.

Referring in detail to the drawing, the numeral 1 indicates a main member constructed of channel iron material and has secured thereto a handle 2 and forked members 3 on which is journaled a reel 4. The reel is employed for supporting a gauge line 5 by having the line wound thereon. The gauge line carries at its free end a weight 6 and when it is desired to gauge the depth of a body of oil the gauge line is fed off of the reel by the rotation of the latter until the weight 6 contacts the bottom of the body of oil. Then by noting the height of the oil on the line the operator can determine approximately the depth of the oil.

An auxiliary member 7 of channel iron formation is pivotally mounted on the main member 1 adjacent one end of the latter and the pivoted end of the auxiliary member carries a lever 8 disposed in a plane above the handle 2 so that a person gripping the handle 2 may employ a finger or thumb of that hand for the actuation of the lever.

Spring means 9 is carried by the main member 1 and connected to the auxiliary member 7 for normally maintaining the latter in substantially parallelism with the main member 1. A portion of the auxiliary member is cut away to permit the gauge line as it leaves the reel 4 to pass between the members 1 and 7 to be contacted by wiping elements 10, one of which is secured to the member 1 and the other is secured on the member 7. The member 7 also carries a brake shoe 11 normally disengaged from the line wound on the reel 4 by the spring means 9. Said spring means 9 consists of a rod 12 pivotally connected with the member 7 and extending through an opening in the member 1 and has mounted thereon a coil spring 13, one end of which bears against the member 1 and the other end bears against a nut 14 threaded on the rod whereby the compression of the spring may be varied.

The shaft 15 employed for supporting the reel 4 on the forked member 3 may be equipped with a suitable crank handle to permit manual rotation of the reel for the purpose of winding the gauge line thereon. During the winding of the gauge line on the reel the lever 8 is released, permitting the spring 13 to bring the wiping elements 10 in engagement with the line to remove therefrom oil and also positioning the brake shoe 11 a sufficient distance from the line as wound on the periphery of the reel so as not to retard the rotation of the reel. During the lowering of the weight 6 into a body of oil, the lever 8 is moved towards the handle 2 freeing the wipers from the gauge line and to bring the brake shoe 11 in engagement with the line on the reel so that the feeding of the line off the reel may be controlled as to its speed of departure from the reel.

What is claimed is:

1. In an oil gauge line device, a main member, a handle on said member, a reel journaled on said member and having wound thereon a weighted gauge line, an auxiliary member pivoted on said main member and having the gauge line passing therethrough as it moves onto and off of the reel, opposed wiper elements carried by said main and auxiliary members to contact opposite sides of the gauge line so as to remove oil therefrom as the line is wound on the reel, spring means connecting said main and auxiliary members and acting to constantly urge and yieldably hold said wiper elements in wiping engagement with the gauge line, a brake shoe located on said auxiliary member in opposed relation to but normally free of engagement with the gauge line as wound on the reel, and manually operable means for moving the auxiliary member on the main member to place the brake shoe in braking engagement with the coiled line on the reel.

2. In an oil gauge line device, a main body member, a handle on said member, a reel journaled on said member and having wound thereon a weighted gauge line, an auxiliary member pivoted on the main body member and having the gauge line passing therethrough as it moves onto and off of the reel, opposed wiper elements carried by said main body and auxiliary members so as to contact the opposite sides of the gauge line as it moves onto and off of the reel, spring means connecting said main body and auxiliary members normally urging said members toward each other whereby to yieldably hold the wiper elements thereon in wiping engagement with the gauge line, a brake shoe carried by the auxiliary member in opposed relation to the circumference of the outer convolution of the gauge line as wound on the reel, and a manually operable lever extension on said auxiliary member cooperatively adjacent the handle of said main body member to effect braking engagement of said brake shoe with the line as wound on the reel.

3. In an oil gauge line device, a main body member, a handle on said member, a bracket on said member in opposed relation to the handle, a reel journaled on said bracket and having wound thereon a weighted gauge line, an auxiliary member pivoted on the main body member at one side of the reel-supporting bracket and having a lever extension cooperatively adjacent the handle of said main body member, said auxiliary member having an opening through which the gauge line passes as it moves onto and off of the reel, opposed wiper elements carried by said main body and auxiliary members at the side of the reel-supporting bracket opposite to that which the pivot of the auxiliary member is adjacent, said wiper elements being arranged to contact the opposite sides of the gauge line as it travels onto the reel, a brake shoe carried by the auxiliary member at the side thereof opposite to that on which the wiper element of said member is mounted and arranged to be brought into contact with the gauge line as wound on the reel, the braking engagement of the shoe with the wound line on the reel being selectively effected by manipulation of the lever extension of the auxiliary member, and adjustable spring means normally urging the auxiliary member towards the main body member and yieldably holding the wiper elements in wiping engagement with the gauge line located therebetween and the brake shoe away from the line as wound on the reel.

SAM O. TRUMAN.